United States Patent [19]

Anthony, III

[11] Patent Number: 5,269,733

[45] Date of Patent: Dec. 14, 1993

[54] POWER TOOL PLASTIC GEAR TRAIN

[75] Inventor: Philip M. Anthony, III, Lindenhurst, Ill.

[73] Assignee: Snap-on Tools Corporation, Kenosha, Wis.

[21] Appl. No.: 885,662

[22] Filed: May 18, 1992

[51] Int. Cl.$^5$ .............. F16H 55/08; F16H 57/06; F16H 1/28; F16H 37/04

[52] U.S. Cl. .................. 475/331; 74/7 E; 74/DIG. 10; 81/57.11; 81/57.31; 173/171; 408/124; 475/149; 475/317; 475/345; 475/902

[58] Field of Search .............. 81/57.11, 57.31; 173/171; 408/124; 475/331, 345, 346, 347, 902, 317, 149; 74/7 E, DIG. 10; 403/326

[56] References Cited

U.S. PATENT DOCUMENTS

| | | | |
|---|---|---|---|
| 1,945,361 | 1/1934 | Ball | 475/149 |
| 2,704,681 | 3/1955 | Fischer | 403/326 |
| 2,998,735 | 9/1961 | Elfes | 475/331 X |
| 3,081,648 | 3/1963 | Duer | 475/902 X |
| 3,655,226 | 4/1972 | Cowan | 403/326 X |
| 4,406,340 | 9/1983 | Gennaux | 475/149 X |
| 4,462,282 | 7/1984 | Biek | 81/57.31 X |
| 4,485,698 | 12/1984 | Adman et al. | 81/57.31 X |
| 4,507,978 | 4/1985 | Tanaka et al. | 475/331 X |
| 4,517,858 | 5/1985 | Schäfer | 475/331 X |
| 4,597,453 | 7/1986 | Kilmer et al. | 173/171 |
| 4,680,979 | 7/1987 | Morishita et al. | 475/347 X |
| 4,763,031 | 8/1988 | Wang | 310/83 |
| 4,838,123 | 6/1989 | Matoba | 475/335 |
| 4,848,172 | 7/1989 | Morishita et al. | 475/347 X |
| 4,899,605 | 2/1990 | Tanaka | 475/331 X |
| 4,918,344 | 4/1990 | Chikamori et al. | 475/149 X |
| 4,983,152 | 1/1991 | Kimberlin et al. | 475/331 |
| 4,986,802 | 1/1991 | Scoville et al. | 475/346 |
| 5,080,642 | 1/1992 | Takami | 475/263 |
| 5,145,471 | 9/1992 | Meier-Burkamp | 475/331 |

FOREIGN PATENT DOCUMENTS 360857 4/1962 Switzerland .............. 475/347
434676 9/1935 United Kingdom .............. 408/124

OTHER PUBLICATIONS

Three Polaroid photographs of Milwaukee Drill gear train/motor/clutch assembly.
Two Polaroid photographs of Panasonic cordless impact wrench motor/gear train.
One Polaroid phtograph of Bosch air drill gear set.
One Polaroid photograph of Hitachi cordless impact wrench motor/gear train.
One Polaroid photograph of Makita cordless impact wrench motor/gear train.

Primary Examiner—Leslie A. Braun
Assistant Examiner—David E. Henn
Attorney, Agent, or Firm—Emrich & Dithmar

[57] ABSTRACT

A power tool with a two-part housing has a drive motor with a pinion gear on the motor shaft. A plastic cylindrical ring gear is fixed to the motor in coaxial surrounding relationship with the pinion gear and has attachment lugs which fit between the two parts of the tool housing and are fixedly secured to each. A plastic gear carrier frame is insert molded on a splined end of a metal output shaft and is receivable within the ring gear and has radial slots for respectively receiving pins which respectively rotatably mount three planet gears in meshing engagement with the pinion gear and the ring gear. The carrier frame has a hollow stub shaft portion which receives the pinion gear therethrough, the stub shaft portion having an elastomeric O-ring seated in a circumferential groove therein for press-fitting a ball bearing thereon, the ball bearing being in turn press-fitted in a seat in the ring gear to support the planet gear assembly.

9 Claims, 2 Drawing Sheets

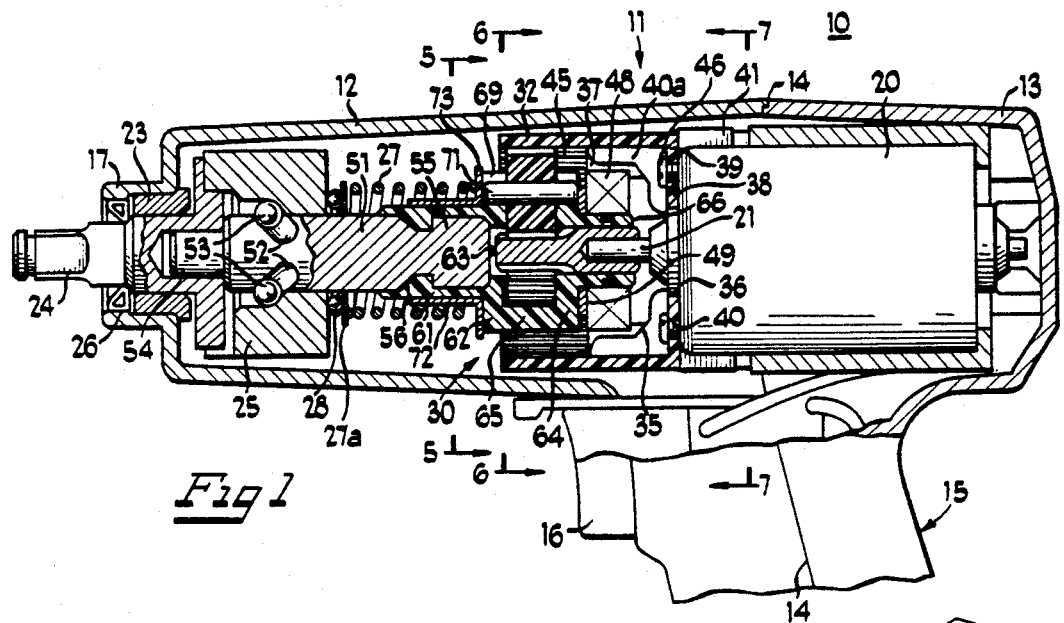
*Fig 1*
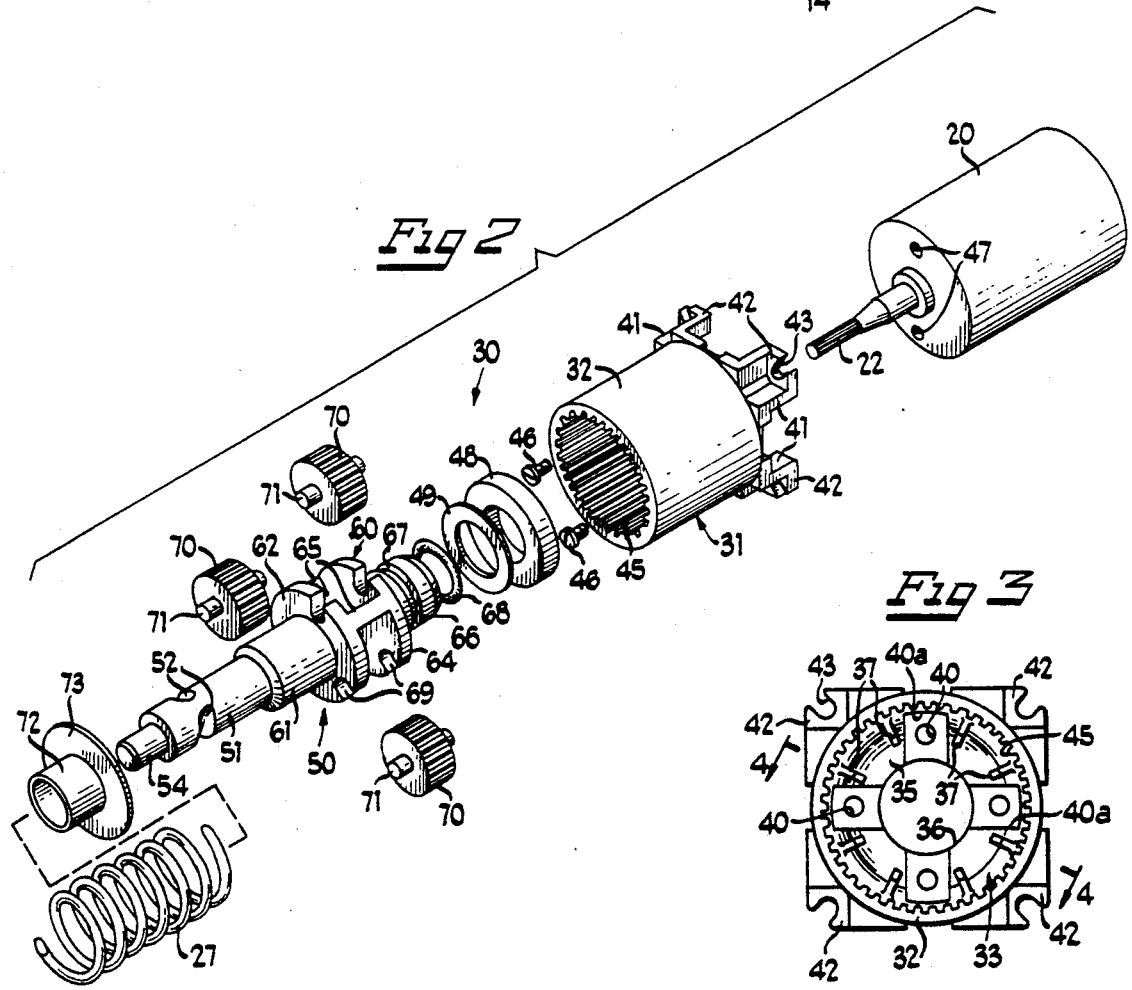
*Fig 2*
*Fig 3*

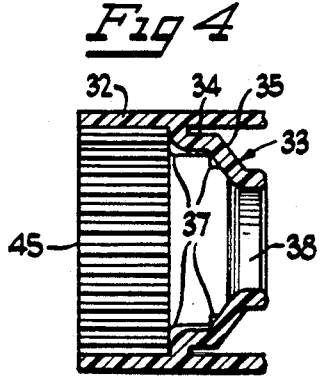
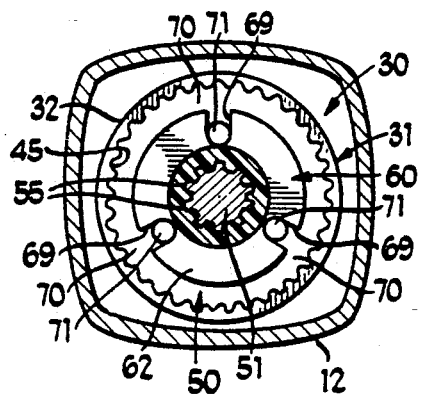
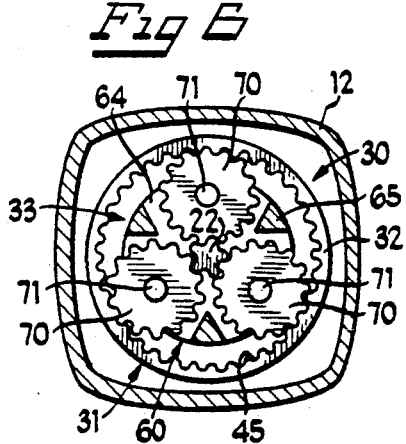
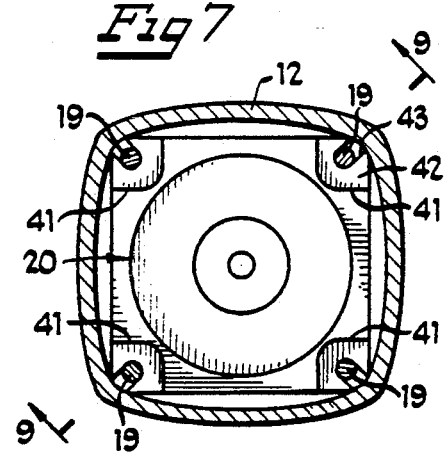
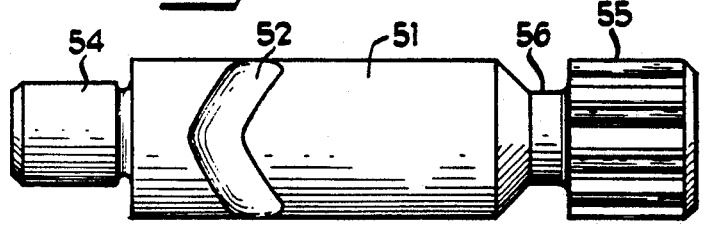
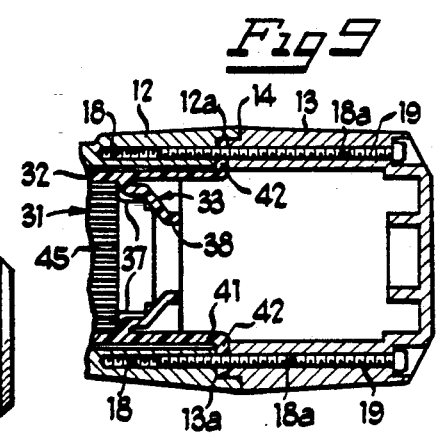

POWER TOOL PLASTIC GEAR TRAIN

BACKGROUND OF THE INVENTION

1. Field of the Invention

The invention pertains to planetary gear assemblies used to improve the torque/speed characteristics of the drive motors of power tools.

2. Description of the Prior Art

Various types of power tools such as drills, impact wrenches and the like utilize electric motors. Planetary gear train assemblies are commonly used with the drive motor to gear down the speed of rotation of the output shaft and to increase the torque transmitted from the drive motor. Such planetary gear trains are commonly multi-part assemblies, including a ring gear, the output shaft, planet gears, a planet gear carrier and means interconnecting the output shaft and the gear carrier. These parts are of complicated construction and, while it is known to provide a plastic ring gear, the other parts are all typically machined metal parts which are very expensive to manufacture. Also, the large number of parts tends to make assembly complicated and expensive.

It is known to provide the output shaft and the planet gear carrier as one piece, such an arrangement being disclosed in U.S. Pat. No. 4,983,152. But the carrier frame/shaft unit is still formed entirely of metal and is very expensive to manufacture.

Also, in prior power tools, it has been difficult to properly align the drive train accurately in the tool housing, while at the same time providing an economical assembly.

SUMMARY OF THE INVENTION

It is a general object of the invention to provide an improved power tool and planetary gear train assembly therefor which avoids the disadvantages of prior such gear train assemblies while affording additional structural and operating advantages.

An important feature of the invention is the provision of a gear train assembly for a power tool which is of relatively simple and economical construction.

In connection with the foregoing feature, another feature of the invention is the provision of a gear train assembly which makes maximum use of molded plastic parts.

Another feature of the invention is the provision of a gear train assembly of the type set forth, which provides economical interconnection of plastic gear parts and a metal output shaft.

Still another feature of the invention is the provision of a gear train assembly of the type set forth, which provides a simple and economical support for the output shaft bearing.

These and other features are attained by providing in a power tool including a motor having a pinion gear, a planet gear frame assembly comprising: a metal shaft, a non-metallic carrier frame integral with the shaft and projecting axially from one end thereof, at least one planet gear, and at least one pin engaged with the frame and rotatably mounting the planet gear for meshing engagement with the pinion gear.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary side elevational view in partial vertical section of an electric motor-powered tool incorporating the present invention, with portions broken away more clearly to illustrate the internal construction;

FIG. 2 is a reduced perspective exploded view of the drive train of the tool of FIG. 1;

FIG. 3 is an enlarged elevational view of the ring gear of FIG. 2 as viewed from the open end thereof;

FIG. 4 is a fragmentary sectional view taken along the line 4—4 in FIG. 3;

FIG. 5 is a view in vertical section taken along the line 5—5 in FIG. 1.

FIG. 6 is a view in vertical section taken along the line 6—6 in FIG. 1.

FIG. 7 is a fragmentary view in vertical section taken along the line 7—7 in FIG. 1;

FIG. 8 is an enlarged side elevational view of the drive shaft of the tool of FIG. 1; and FIG. 9 is a reduced, fragmentary, sectional view taken along the line 9—9 in FIG. 7, with portions removed to show attachment of the ring gear to the tool housing.

DESCRIPTION OF THE PREFERRED EMBODIMENT

Referring to FIGS. 1 and 9, there is illustrated a power tool in the nature of an impact wrench, generally designated by the numeral 10, and incorporating the gear train of the present invention. The tool 10 has a two-part housing assembly 11 which is split front-to-back, and includes a front housing 12 and a rear housing 13, respectively having end surfaces 12a and 13a and joined at a junction 14. More specifically, four internally threaded bores 18 in the front housing 12 are respectively aligned with four bores 18a in the rear housing 13 (two shown) for respectively receiving four screws 19 to fasten the housings 12 and 13 together. The housing assembly 11 includes a handle portion 15 which may contain a rechargeable battery pack (not shown) in a known manner. Mounted in the front of the handle portion 15 is an actuating trigger 16. The front housing 12 has a reduced-diameter cylindrical nose 17 at the front end thereof.

The tool 10 is powered by a DC electric motor 20 which is seated in the rear housing 13 and has a forwardly projecting output shaft 21 on which is mounted a pinion gear 22 (FIG. 2) for rotation therewith. The tool 10 has an anvil 24 projecting from its forward end and mounted in a suitable bushing 23 and adapted to be coupled to an associated bit or socket in a known manner, the anvil 24 being driven by a hammer 25 in a known manner and being sealed with an oil seal 26. The hammer 25 is thrust forwardly by a spring 27 acting through a washer 27a and a thrust bearing 28.

Referring also to FIGS. 2-4, the motor 20 drives the hammer 25 through a drive train 30, which includes a planetary gear train incorporating the features of the present invention. The drive train 30 includes a molded plastic ring gear 31, which has a cylindrical outer wall 32 and an inner wall 33 (FIG. 4) which projects radially inwardly and rearwardly from the outer wall 32 at a location approximately midway between its forward and rearward ends. More specifically, the inner wall 33 has a generally cylindrical side portion 34 and a generally frustoconical portion 35, having a circular opening 36 (FIG. 3) centrally therethrough at the rear end thereof. A plurality of equiangularly spaced-apart ribs 37 project radially inwardly from the cylindrical side portion 34 and radially inwardly and forwardly a slight distance from the frustoconical portion 35 of the inner wall 33 to define a bearing seat. A cylindrical flange 38 (FIG. 4) projects rearwardly from the inner wall 33 around the circumference of the opening 36, the rear end of the flange 38 being coupled to the rear end of the cylindrical outer wall 32 by four equiangularly spaced-apart radial end webs 39 (two shown in FIG. 1), each having a hole 40 therethrough. Four recesses 40a are formed in the inner wall 33 to provide access to the holes 40 (see FIGS. 1 and 3).

Projecting rearwardly from the cylindrical outer wall 32 are four generally V-shaped lugs 41 (FIG. 3), each provided with an end wall 42, the end walls 42 being substantially coplanar and perpendicular to the axis of the ring gear 31. Each of the end walls 42 has a diagonal slot 43 therein.

Gear teeth 45 are formed on the inner surface of the cylindrical outer wall 32, each tooth extending longitudinally from the front end of the cylindrical outer wall 32 to the front end of the inner wall 33.

In use, the end webs 39 of the ring gear 31 are disposed flush against the front surface of the housing of the motor 20, with the pinion gear 22 projecting coaxially through the opening 36, which opening is large enough to accommodate the hub portion of the motor housing. The ring gear 31 is fixedly secured to the motor 20 by screws 46 (FIG. 1) which are passed through two of the openings 40 in the webs 39 and engaged in threaded openings 47 in the front wall of the motor 20 (see FIG. 2). The lugs 41 are dimensioned to extend rearwardly along the outside of the motor 20. The lugs 41 of the ring gear 31 are adapted to fit between the end surfaces 12a and 13a of the front and rear housings 12 and 13 and be secured thereto by the screws 19 which are respectively received through the slots 43 (see FIG. 9). Thus, it will be appreciated that the ring gear 31 is fixedly secured to both the motor 20 and to the tool housing assembly 11.

The drive train 30 also includes a ball bearing 48 which is press-fitted into the bearing seat formed by the ribs 37 on the ring gear inner wall 33, coaxially with the ring gear 31. The front surface of the ball bearing 48 is covered by a washer 49.

Referring also to FIGS. 5-8, the drive train 30 also includes a gear carrier 50 which includes a machined metal drive shaft 51 which extends coaxially through the hammer 25 and is provided with a pair of generally V-shaped grooves or channels 52 in which balls 53 are respectively seated for cooperation with a cylindrical axial bore in the front end of the hammer 25 for effecting an oscillatory movement of the hammer 25 in a known manner. The drive shaft 51 has a reduced-diameter forward end 54 which is seated in a complementary axial bore in the rear end of the anvil 24. The rear end of the drive shaft 51 has a plurality of circumferentially spaced-apart longitudinal splines 55 which extend forwardly to a circumferential channel or groove 56 in the outer surface of the drive shaft 51.

The gear carrier 50 includes a molded plastic carrier frame 60, and it is a significant aspect of the invention that this carrier frame 60 is insert molded on the drive shaft 5 so as to form an integral construction. More specifically, the carrier frame 60 has a cylindrical shank 61 which is molded around the rear end of the drive shaft 51 so as to completely cover the splines 55 and fill the grooves therebetween as well as the circumferential groove or channel 56, so that when the molded plastic has set, it forms a rigid bond to the drive shaft 51 and is immovable with respect thereto so that the drive shaft 51 and the carrier frame 60 act as a single piece.

The rear end of the shank 61 is unitary with a radially outwardly extending front end plate 62, the rearward surface of which is disposed a predetermined distance rearwardly of the rear end of the drive shaft 51 so as to form a cylindrical recess 63 (see FIG. 1). Spaced rearwardly from the front end plate 52 is an identically shaped annular rear end plate 64, the two plates 62 and 64 being interconnected by three longitudinally extending struts 65, each of which is substantially triangular in transverse cross section (see FIGS. 2 and 6). Unitary with and projecting rearwardly from the rear end plate 64 coaxially therewith is a hollow cylindrical stub shaft 66, which has a circumferential groove 67 in the outer surface thereof. An elastomeric o-ring 68 is seated in the groove 67 and has a thickness such that it projects radially outwardly a slight distance beyond the outer surface of the stub shaft 66. Each of the end plates 62 and 64 has three equiangularly spaced-apart radial slots 69 therein, the slots in the front plates 62 being respectively longitudinally aligned with those in the rear plate 64 and spaced circumferentially midway between the struts 65.

The drive train 30 also includes three molded plastic planet gears 70, each having an axial bore therethrough in which is received an axial pin 71, the pins 71 being respectively seated in the pairs of slots 69 in the end plates 62 and 64 so that the gears 70 are disposed between the end plates 62 and 64 are freely rotatable about the axes of the pins 71. It will be appreciated that the slots 69 permit easy assembly of the gear carrier 50 with the planet gears 70 and permits easy replacement of the planet gears 70.

In assembly, the carrier frame 60 is disposed coaxially within the ring gear 31, with the stub shaft 66 being pressfitted into the ball bearing 48, frictional engagement therebetween being facilitated by the 0-ring 68. The pinion 22 is received coaxially through the stub shaft 66 and the front end thereof is piloted in the recess 63 in the front end plate 62. Thus, it will be appreciated that the gear carrier 50 is firmly supported on the ball bearing 48 and the anvil 24 in coaxial alignment with the motor shaft 21 and the cylindrical nose 17 of the housing assembly 11. The planet gears 70 are so dimensioned as to be disposed in meshing engagement with both the pinion gear 22 and the gear teeth 45 of the ring gear 31. It will be appreciated that the washer 49 serves to prevent rearward movement of the gear pins 71 and prevent interference thereby with the ball bearing 48. A bushing 72 encircles the shank 61 of the carrier frame 60 and has a radial flange 73 at its rear end which abuts the front end plate 62. The flange 73 serves as a rear bearing plate for the spring 27 and prevents forward movement of the pins 71.

In operation, it will be appreciated that, as the pinion gear 22 is rotated by the motor 20, it will rotate the planet gears 70, causing them to walk around the circumference of the fixed ring gear 31, thereby rotating the gear carrier 50 at a speed which is slower than the rotational speed of the motor shaft 21 by a factor determined by the gear ratio.

It is a significant aspect of the invention that it utilizes a minimum number of parts, this fundamentally being achieved by forming the drive shaft 51 and the carrier frame 60 as an integral single part. It is a further significant aspect of the invention that the drive train 30 is of simple and economical construction, this being realized fundamentally by the fact that the carrier frame 60, the planet gears 70 and the ring gear 31 are all molded plastic parts, this construction being achieved while still maintaining a metal drive shaft 51 by insert molding the carrier 60 on the drive shaft 51. The assembly is simple, requiring only two screws to fasten the ring gear 31 to the motor 30, the drive train being fastened to the housing assembly 11 by the four existing housing assembly screws 19. All the other parts are assembled without the use of fasteners. This arrangement rigidly mounts the entire drive train 30 and the associated motor 20 in a fixed coaxial alignment in the housing assembly 11.

I claim:

1. In a power tool including a motor having a pinion gear, a planet gear frame assembly comprising: a metal shaft having a circumferential groove formed therein, said groove having a first side wall and a second side wall and a bottom wall with one of said side walls defining a stop surface, a non-metallic carrier frame insert molded on said shaft and projecting axially from one end thereof, said carrier frame filling said groove during said insert molding and defining a portion bearing against said stop surface to resist axial movement of said carrier frame relative to said shaft, said one end of said shaft having first splines thereon with spaces therebetween, said carrier frame filling said spaces during said insert molding to form second splines, said first and second splines cooperating to prevent relative rotation between said carrier frame and said shaft about the axis thereof, at least one planet gear, and at least one pin engaged with said frame and rotatably mounting said planet gear for meshing engagement with the pinion gear.

2. The power of tool of claim 1, wherein said carrier frame is formed of plastic.

3. The power tool of claim 1, wherein said carrier frame has at least one radial slot therein for receiving said pin.

4. In a power tool including a housing and a motor mounted in the housing and having a pinion gear, a gear train assembly comprising: a non-metallic cylindrical ring gear adapted to be fixed to the motor in coaxial surrounding relationship with the pinion gear, a non-metallic carrier frame disposed within said ring gear, said carrier frame having a hollow shaft portion coaxially receiving the pinion gear therein, at least one non-metallic planet gear, at least one pin engaged with said frame and rotatably supporting said planet gear for meshing engagement with the pinion gear and with said ring gear, bearing means fixed in said ring gear and rotatably supporting said carrier frame within said ring gear, and a metal output shaft having a circumferential groove formed therein, said groove having a first side wall and a second side wall and a bottom wall with one of said side walls defining a stop surface, said carrier frame being insert molded on one end of said shaft and filling said groove during said insert molding and defining a portion bearing against said stop surface to resist axial movement of said carrier frame relative to said shaft, said one end of said shaft having first splines thereon with spaces therebetween, said carrier frame filling said spaces during said insert molding to form second splines, said first and second splines cooperating to prevent relative rotation between said carrier frame and said shaft about the axis thereof.

5. The power tool of claim 4, wherein said ring gear and said carrier frame and said planet gear are all formed of plastic.

6. The power tool of claim 4, wherein said carrier frame is of unitary one-piece construction.

7. The power tool of claim 4, wherein said bearing means is disposed circumferentially around said hollow shaft portion of said carrier frame, and further comprising friction means on said hollow shaft portion frictionally engageable with said bearing means, and seat means on said ring gear for receiving said bearing means in press-fitted engagement therewith.

8. The power tool of claim 4, wherein the housing has two parts, said ring gear including attachment portions disposed between the two housing parts, and further comprising means fixedly securing said attachment portions to each of the housing parts.

9. The power tool of claim 6, wherein said gear train assembly includes three planet gears and three pins respectively rotatably supporting said planet gears at equiangularly spaced-apart locations on said carrier frame.

* * * * *

UNITED STATES PATENT AND TRADEMARK OFFICE
CERTIFICATE OF CORRECTION

PATENT NO. : 5,269,733
DATED : December 14, 1993
INVENTOR(S) : Philip M. Anthony, III It is certified that error appears in the above-indentified patent and that said Letters Patent is hereby corrected as shown below:

On the title page: Item
[56] Other Publications, third reference, "phtograph" should be --photograph--.

Column 6, line 48, "6" should be --4--.

Signed and Sealed this

Sixteenth Day of August, 1994

Attest:

BRUCE LEHMAN

*Attesting Officer*  *Commissioner of Patents and Trademarks*